No. 742,137. PATENTED OCT. 20, 1903.
J. A. TILDEN.
METER.
APPLICATION FILED JULY 8, 1903.
NO MODEL.

Witnesses:
Charles F. Logan
H. H. W. Grenier

Inventor:
James A. Tilden,
by Sylvanus H. Cobb.
Atty.

No. 742,137. Patented October 20, 1903.

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

METER.

SPECIFICATION forming part of Letters Patent No. 742,137, dated October 20, 1903.

Application filed July 8, 1903. Serial No. 164,640. (No model.)

*To all whom it may concern:*

Be it known that I, JAMES A. TILDEN, a citizen of the United States, residing at Hydepark, in the county of Norfolk and State of Massachusetts, have invented certain new and useful Improvements in Meters, of which the following is a specification.

My invention relates to meters, and more particularly to the movable measuring device in fluid-meters of the disk type, having for its principal objects the provision of such a measuring device or disk which shall be comparatively light in weight and of such strength as to readily resist the stresses to which it may be subjected.

It consists in the various features hereinafter described and claimed.

Figure 1:
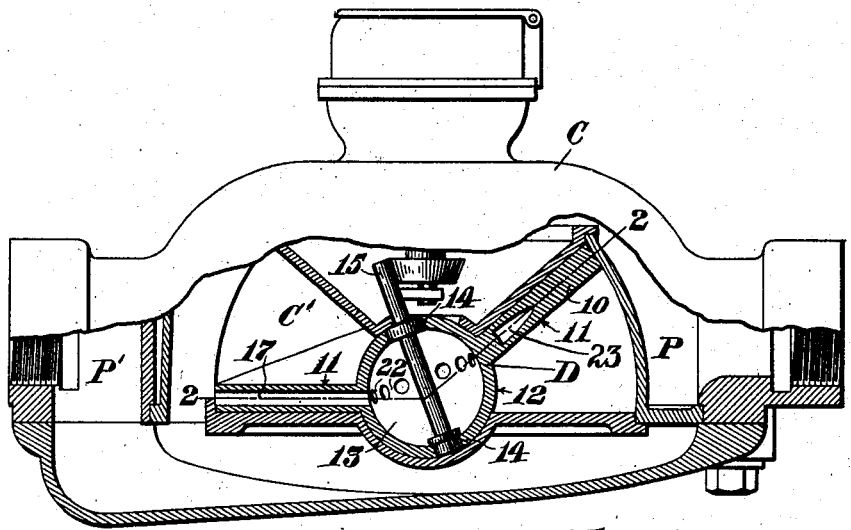
Figure 2:
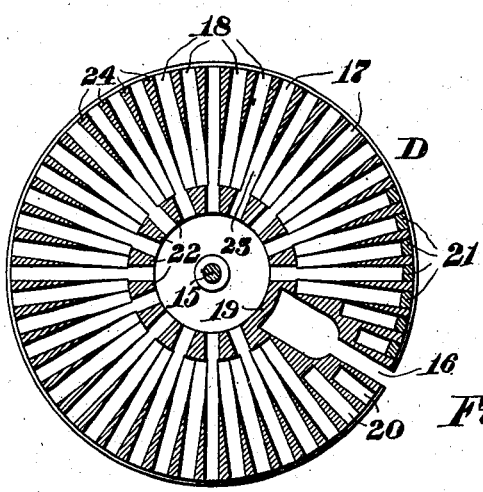

In the accompanying drawings, Figure 1 is a side elevation of a meter employing one embodiment of my invention, parts being broken away and in section; and Fig. 2 is a section of the disk on the line 2 2 of Fig. 1.

Similar characters designate like parts throughout both figures of the drawings.

The measuring devices or disks of disk meters are subject to severe strains in use—such, for example, as those arising from water-hammer in the system—and to enable them to successfully withstand such shocks the disks are commonly constructed of solid plates of some comparatively light material, as hard rubber, the weight of which will not bring undue wear upon its bearing. It may, however, frequently be desired to use instead a metallic disk, as in situations where it is subjected to the action of hot water, which tends to alter the shape of the rubber, and it then becomes important to construct a disk which is as light as possible, while possessing ample strength to prevent distortion. To this end disks have been formed with the metal removed from portions of their outer faces and also constructed in upper and lower sections secured together and so provided with ribs that chambers are left between them. While both these arrangements greatly lighten the disk, they leave it structurally weak. Moreover, the first-named form renders it difficult to secure perfect contact between the faces and the coacting walls of the casing, while the other is difficult to make and is liable to result in leakage through the disk. It will be evident that the introduction of any one of these faults may seriously impair the accuracy of the meter. My improved construction overcomes such difficulties in the manner which will now be described.

The letter C indicates a meter-casing of suitable form, in the measuring-chamber C' of which is contained the measuring device or disk D and from which open the inlet and outlet passages P P', respectively. As here illustrated, this disk consists of a plate 10, of conical form, having upper and lower smooth or unbroken faces 11 11, contacting with similar walls of the chamber along ever-changing lines during the gyration of the disk and provided at its center with the usual bearing protuberance or ball 12. The plate and ball are preferably cast or otherwise formed integrally of metal or other desired material, the ball being cored out or hollowed to leave a chamber 13, surrounded by a wall of suitable thickness, through which are opposite openings 14 14, lying in the axis of the plate, in which the spindle 15 is suitably secured. Through the plate is the usual radial slot 16 to embrace the casing-diaphragm, and upon each side of this slot about the entire disk between the faces 11 11 are spaces or passages extending from the periphery toward the central chamber. These passages may be conveniently drilled, forming closely-placed bores, of which a portion, here shown as every third and designated by the numeral 17, open into the central chamber, while those intermediate, numbered 18, terminate a short distance therefrom, leaving a wall 19. The passages 20, adjacent to the slot 16, are preferably of less length than the companion passages to avoid breaking through the walls of the slot. The peripheral openings of the passages coming opposite the inlet P are closed, by means of plugs 21, to prevent leakage of fluid unmeasured through the disk. The above arrangement of internal spaces results in a central chamber 13, about which within the material of the plate is a wall 19, perforated by the passages 17, which are separated by partitions 22. Then outside of this, where the bores intersect, is an annular chamber 23 and finally the series of peripheral passages 17 and 18, at each side of which are partitions 24, supporting, with the partitions 22, the outer walls. It will be seen that this disk while presenting no difficulties in construction and retaining its uninterrupted contact-faces is greatly lightened by the removal of much of the material and still offers effectual resistance to distortion, particularly through the walls or partitions at both the inner and outer portions of the plate, such partitions being in the form of arches, and therefore possessing maximum resistive efficiency.

Having thus described my invention, I claim—

1. A measuring device comprising an integral disk having a hollow protuberance and provided with passages opening through the periphery of the disk and leading toward the center.

2. A measuring device for meters comprising an integral disk having a hollow protuberance at its center and provided with passages leading from the periphery of the disk, a portion of which passages connect with the hollow center and the remainder terminate outside said center.

3. A measuring device for meters comprising a disk provided with a central chamber and passages extending from said chamber.

4. A measuring device for meters comprising a disk provided with a central chamber, a perforated wall surrounding this chamber and an annular chamber outside the wall.

5. A measuring device for meters comprising a disk provided with a central chamber, a perforated wall surrounding this chamber, an annular chamber outside said wall and passages leading from the central chamber through the periphery of the disk.

6. A measuring device for meters comprising a disk having radial bores extending inward from its periphery.

7. A measuring device for meters comprising a disk having radial bores extending inward from its periphery, a portion of said bores being of greater length than the remainder.

8. A measuring device for meters comprising a disk having a hollow protuberance at the center and radial bores extending from the periphery toward the center.

9. A measuring device for meters comprising a disk having passages opening through its periphery and means for closing the openings of at least a portion of the passages.

10. A measuring device for meters comprising a disk having communicating radial bores and plugs closing the openings of a portion of said bores.

Signed at Boston, in the county of Suffolk and State of Massachusetts, this 6th day of July, 1903.

JAMES A. TILDEN.

Witnesses:
HENRY D. WINTON,
FRANCIS C. HERSEY, Jr.